Oct. 10, 1961  C. M. L. L. BOURCIER DE CARBON  3,003,596
SHOCK ABSORBERS
Original Filed Feb. 21, 1955  3 Sheets-Sheet 3
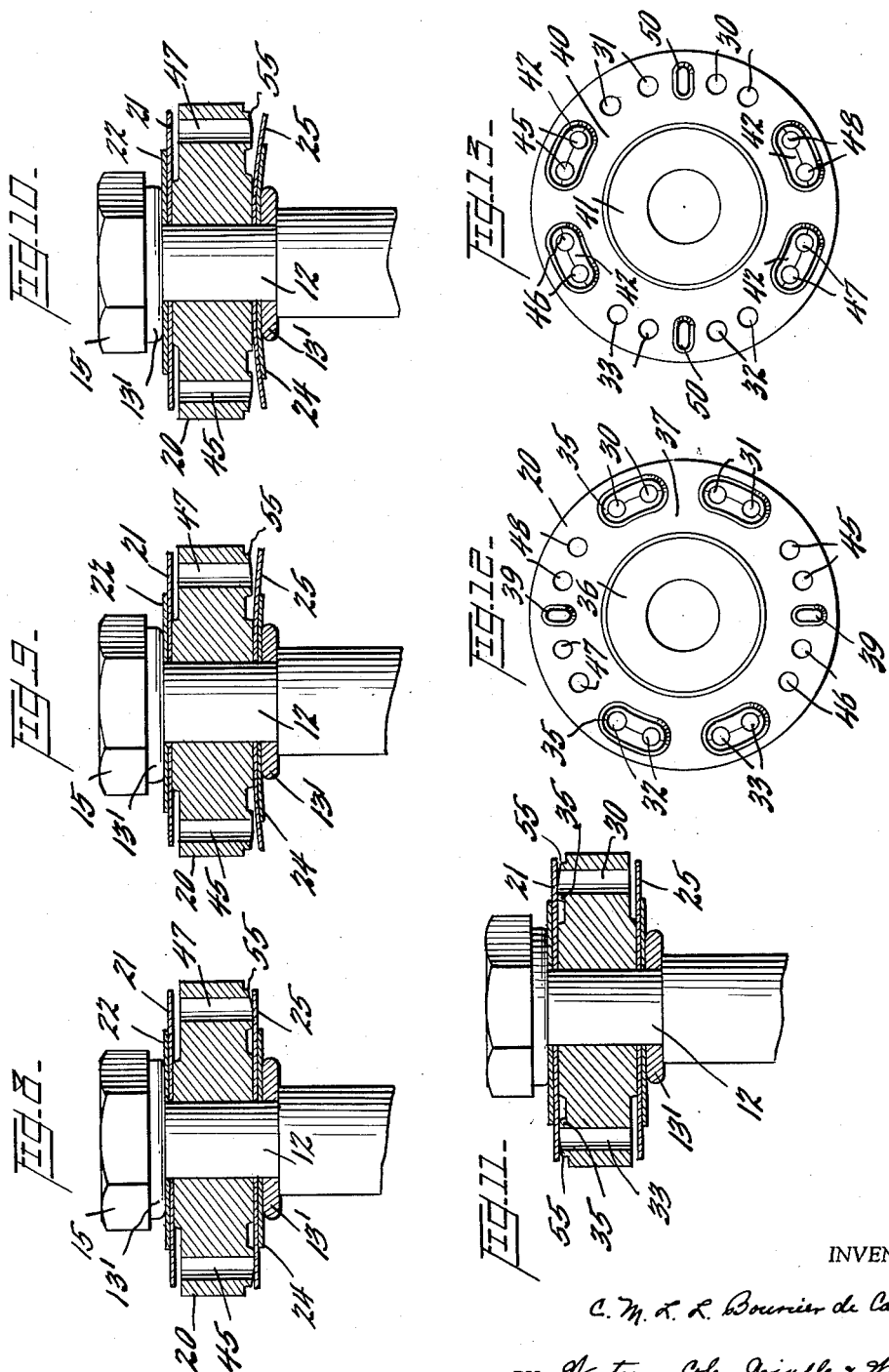
INVENTOR
C. M. L. L. Bourcier de Carbon
BY Watson, Cole, Grindle & Watson
ATTORNEYS United States Patent Office 3,003,596
Patented Oct. 10, 1961

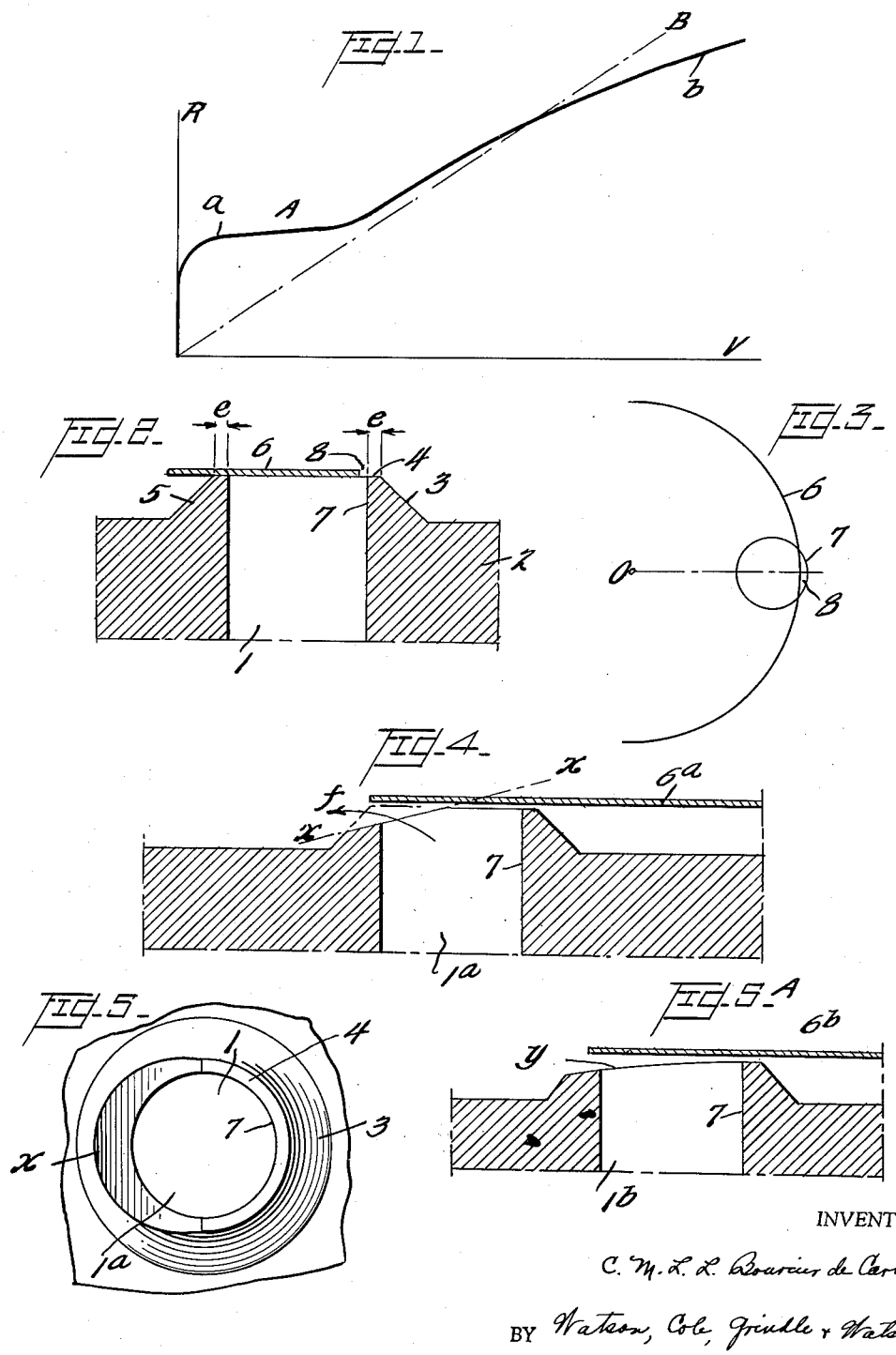

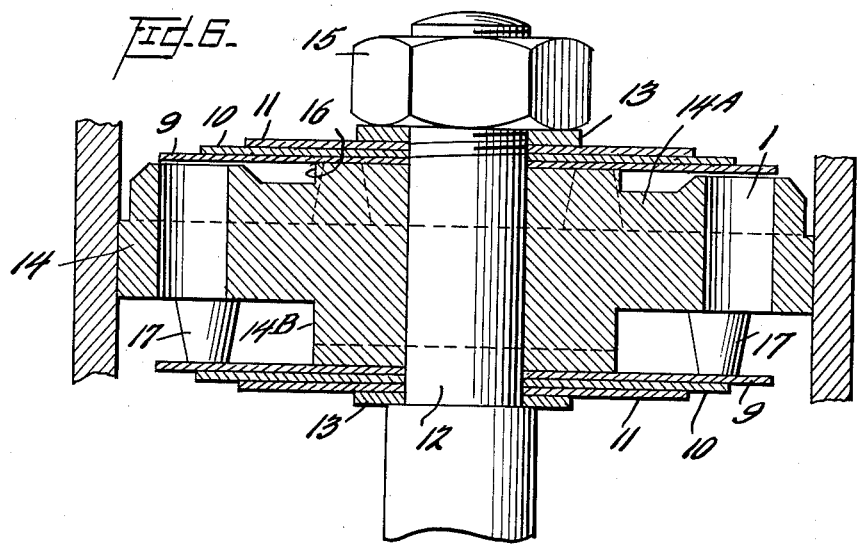
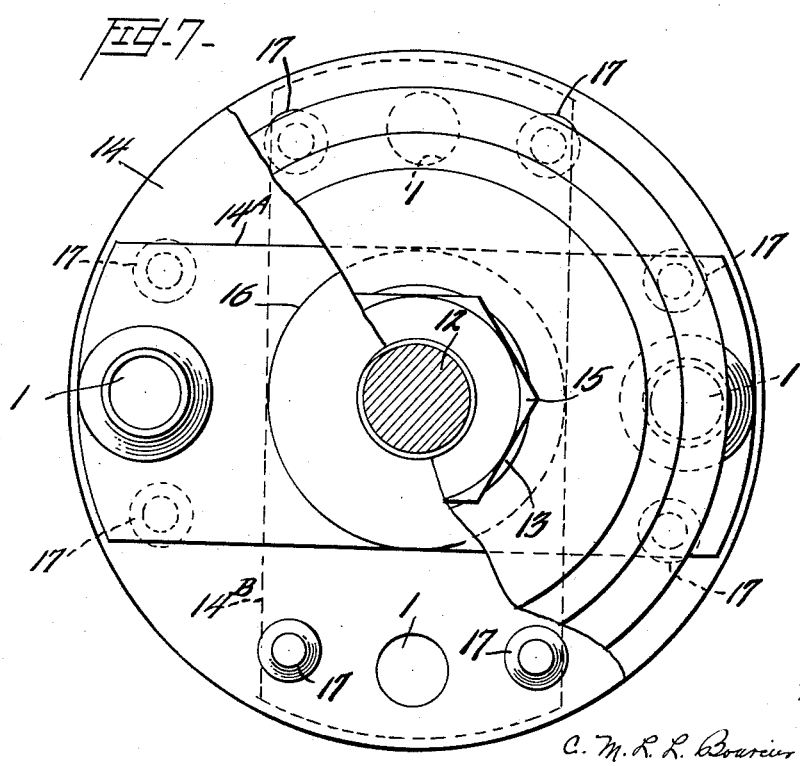

3,003,596
SHOCK ABSORBERS
Christian Marie Lucien Louis Bourcier de Carbon,
64 Blvd. Maurice-Barres, Neuilly-sur-Seine, France
Original application Feb. 21, 1955, Ser. No. 489,694.
Divided and this application Mar. 11, 1959, Ser. No. 798,707
6 Claims. (Cl. 188—88)

This invention relates to shock absorbers and more particularly to shock absorbers of the fluid displacement type adapted especially for use on automotive vehicles, although capable of employment in cushioning or braking shocks sustained by other devices and mechanisms.

This application is a division of my copending application Serial No. 489,694, filed February 21, 1955, and now forfeited; which application is a continuation-in-part of my application Serial No. 230,944, filed June 11, 1951, now patent No. 2,748,898.

More particularly the invention relates to improvements in pistons used in such hydraulic devices, which pistons are provided with passageways leading from one side to the other thereof, the passageways being controlled by disc or flap valves usually consisting of a thin resilient sheet of metal or other suitable material.

It is the general object of the present invention to provide a novel and improved shock absorber piston in which the curve of shock absorber resistance as a function of the piston velocity is approximately a straight line. More specifically, it is an object of the invention to attain a construction and operation of the piston by providing novel valving arrangements which control the by-passing of fluid from one side of the piston to the other during operation so that the aforesaid object of the invention in straightening the resistance-velocity curve may be attained.

Other objects and features of novelty will be apparent from the following specification when read in connection with the accompanying drawings in which certain embodiments of the invention are illustrated by way of example.

In the drawings:

FIGURE 1 is a graph in which certain characteristics of the shock absorber of this general type are indicated by curves, and in which the resistance R of the damping is shown as a function of piston velocity V;

FIGURE 2 is a fragmentary vertical sectional view through the valved orifice portion of a by-pass passageway through the piston of a shock absorber embodying the principles of my invention; the relationship of this orifice to the other parts of the piston being readily apparent from a comparison with FIGURE 6, described below;

FIGURE 3 is a diagrammatic plan view of the orifice valve arrangement shown in FIGURE 2;

FIGURE 4 is a view similar to FIGURE 2 showing a modification of the orifice valving;

FIGURE 5 is a fragmentary plan view of the orifice shown in FIGURE 4;

FIGURE 5A is a fragmentary view similar to FIGURE 4 showing a slightly modified form of orifice;

FIGURE 6 is a vertical sectional view of a shock absorber piston illustrating a still further modification of the valving provisions;

FIGURE 7 is a top plan view of the piston shown in FIGURE 6, with a portion of the valving broken away to better illustrate the construction of the piston body;

FIGURES 8, 9 and 10 are views similar to FIGURE 6 showing a modified multiple-orifice piston in three respective conditions of operation during the compression stroke of the piston;

FIGURE 11 is a similar view showing a condition of minimum opening of the valving on the rebound stroke;

FIGURE 12 is a top plan view of the piston shown in FIGURES 8–11; and

FIGURE 13 is a bottom plan view of that piston.

In order to obtain the best possible damping, particularly in the case of shock absorbers for land vehicles, it is preferable that the curve of the resistance R of the shock absorber, as a function of the speed V of the piston thereof, be as near a straight line as possible. It has been found that this curve, in the case of pistons of the general construction of that shown in my aforesaid patent No. 2,748,898 (that is, where the sheet or disc valves seat upon an orifice opening out of a plane surface) has the shape indicated at A in the graph comprising FIGURE 1 of the present drawings.

In other words, a substantial viscous resistance opposes the flow of oil during operation so long as the valves are not raised or opened a considerable amount, say a distance of the order of magnitude of a few tenths of a millimeter. The hydraulic force necessary to open the valves to this initial extent is equivalent in practice to a resistance which would be encountered by very small movements of the piston as during travel of the vehicle on a relatively smooth paved street or boulevard, and this makes such boulevard riding less smooth than should be expected.

The improvements which are the subject of the present invention are directed primarily at bringing the said curve A as close to the straight line indicated at B in the graph, as possible.

One way of initiating this conformation of the curve A would be to add other passageways through the piston which are not controlled by the valving provisions. The presence of such passageways and orifices tends to flatten the curve near the origin, but without having any practical effect beyond this.

Secondly, one may proceed by combating this phenomenon at its source by seeking to decrease the constant visoscity resistance to flow through the valve, by seeing to it that the streams of liquid through the orifices are made laminar or flattened over the smallest possible length of their course, say for example, for a distance not substantially more than approximately 1 mm.

This result can be obtained in various ways, particularly by the following means which may be applied either separately or one in combination with any or all of the others;

(a) The thin sheet which constitutes the resilient disc valve may be so cut that its peripheral edge is practically tangential to the margin of the orifice, so that the covering of the orifice is at a minimum (such as in my Patent No. 2,748,898);

(b) The seat surrounding the orifice against which the valve closes may be made extremely thin or narrow rather than with a wide supporting surface for the valve, at least over a part of the periphery thereof. For example, the valve seat may be provided in the general shape of the edges of a crater of a volcano (see also, for example, my Patent No. 2,815,100, granted December 3, 1957);

(c) This effect may probably best be attained by providing a valving construction whereby the orifice controlled by the disc valve is permanently open to an exceedingly small extent. This result can be obtained in a number of different ways, as will be seen from an inspection of FIGURES 2–6 of the drawings. A general inspection of these figures reveals that the effect may be attained, first by arranging the periphery of the disc valve a little short of tangency with the periphery of the orifice thus leaving a very small space between these peripheries as at 8 in FIGURES 2 and 3; the edge of the orifice may be bevelled or chamfered off as on the secant plane X—X in FIGURES 4 and 5; this bevelling or chamfering may be effected along a curved line as suggested at y in FIGURE 5A; or the disc valving may be initially spaced a small distance from the orifice of the passageway, throughout the periphery of the orifice, as indicated in FIGURE 6.

For purposes of convenience, it might be well to describe in detail the embodiments shown in FIGURES 6 and 7 first since they, although fragmentary in execution, show the mounting of the piston on the piston rod and the fitting of the piston to the walls of the shock absorber cylinder. The piston rod is provided with narrowed or attenuated end portion 12, the extreme end of which is provided with screw threads upon which is adapted to be screwed the retaining nut 15. Just above the shoulder at the base of the portion 12 and just below the nut 15, there are disposed retaining washers or discs 13 which fit snugly around the piston rod stem 12 and enclose between themselves the piston and valving structure.

The central portion 14 of the piston is circular in transverse section and fits snugly within the cylindrical walls of the shock absorber cylinder as clearly shown in FIGURE 6. Somewhat along the lines of the piston illustrated in my Patent No. 2,748,898, a basically oblong raised portion is formed on the upper surface of the midportion 14 and extends from right to left of FIGURES 6 and 7 and is designated 14A. A similar oblong boss designated 14B is formed on the underside of the intermediate portion 14 of the piston and extends at right angles to the top boss. In this example, two pairs of fluid passageways extend through the piston, two of the passageways passing through the intermediate portion 14 and the upper extended oblong portion 14A, these being shown in FIGURE 6, and two of them passing through the intermediate portion 14 and the lower oblong boss 14B as shown at the top and bottom portions of FIGURE 7. The passageways shown in FIGURE 6 are the rebound passageways and their orifices opening out through an annular frusto-conical or crater-like boss formed in the portion 14A are adapted to be controlled by the stack of valving discs 9, 10 and 11 shown at the top of FIGURE 6. Any desired number of these discs may be employed depending upon the qualities of the shock absorber desired, and they are preferably of graduated diameters, the larger disc of course nearest the orifices.

The opposite passageways 1, those shown at the top and bottom of FIGURE 7, are compression orifices and open downwardly through similar cone-like or crater-like orifices which are controlled by the lower sets of valve discs 9, 10 and 11.

In order to maintain the initial planar position of the valve discs, and to protect them against fatigue and breakage and to prevent reverse bending, pedestals or supports 17 are provided, these supports occurring in pairs which are spaced at approximately 90° from the mouth of the orifices upon the same side of the piston. For example, the pedestal 17 disclosed in solid lines at the bottom of FIGURE 7 tends to limit the closing of the valve discs which control the upper orifice of the passageway 1 which occurs at the left side of FIGURE 7; whereas the pedestals 17 which occur at both side portions of FIGURES 6 and 7 (shown in solid lines in FIGURE 6 and dotted lines in FIGURE 7) serve to limit the closed position of the lower set of valves 9, 10 and 11 which control the orifices of the openings at the top and bottom of FIGURE 7. In their limited minimum opening positions the valves are spaced a very slight distance, of the ordered magnitude of say a few tenths of a millimeter, away from the mouth of the orifices as clearly shown in the valving illustrated in the upper portion of FIGURE 6.

A circular boss 16 is provided on the oblong upper and lower bosses 14A and 14B, the upper one of these bosses being clearly shown in FIGURES 6 and 7 at 16, and the sets of valve discs are clamped between the circular bosses and the respective retaining plates or washers 13. In this way, the stack of resilient discs is given great rigidity in its central portion while retaining flexibility in its peripheral portion.

Another means for attaining the desired solution of the problem is the one illustrated in FIGURES 4 and 5 of the drawings in which the conical crater of the orifice of the passageway 1a is chamfered or bevelled off on a diagonal plane x—x and this affords a preliminary or initial additional opening of the orifice as indicated at f. The angle of inclination of the plane x—x which modifies the seat of the valve may preferably lie between about 3° to about 10° with respect to the horizontal. In this case the initial spacing of the valve disc, shown at 6a in FIGURE 4, can be provided also, as in the case of the previously described embodiment. Further, it is possible for the valve 6a, during opposite movement of the piston, to conform itself somewhat to the bevelled surface of the orifice to effect closure thereof. This closing effect on reverse stroke may be more readily attained in the embodiment illustrated in FIGURE 5A where the bevelling is along a rounded or gently curved substantially spherical surface y. The minute free passage of oil at f has the result of offering a certain cross-section of opening even before the disc valve has begun to open.

Another solution which can be combined with any one of the previously described embodiments consists of causing the valve disc 6 to close somewhat short of the outer marginal portion 7 of the orifice 1, as illustrated in FIGURES 2 and 3. In other words, the periphery of the valve disc 6 is positioned inwardly of the point of tangency with the periphery 7 of the orifice, thus leaving a small cusp-like opening or crack 8 through which the damping fluid may pass.

It is also within the scope of the invention to use in any of the embodiments, either a single disc valve as shown in FIGURES 2–5A inclusive or multiple graduated sheets of foil of decreasing dimensions as shown in FIGURES 6 and 7.

Referring back again to FIGURE 1 of the drawings, it can be seen that the curve A of resistance of the shock absorber as a function of the speed V of the piston has near its origin a portion $a$ which is quite far away from the straight line B. The explanation of this shape of the curve is that the flow of the damping liquid when the valve consists of a sheet of foil, and when the seat of the valve is a broad flat surface, is opposed (in the case of very small lifting motions) by substantial viscous resistance or stickiness. In order that the flow become normal and of any substantial degree, it is necessary that the valve foil or disc be raised several tenths of a millimeter. Due to these phenomena, furthermore, the temperature variations which exert an influence on the viscosity of the liquid, modify the operation of the shock absorber.

These phenomena are all the more important the more viscous the liquid (for example oil) used as the damping medium in the shock absorber. Now it is preferable to use a viscous liquid in these shock absorbers for other reasons, in particular to decrease the possibility of leakage between the piston and the cylinder and to avoid the harmful influence of any possible lack of precision in the production of the tubes or cylinders and pistons.

The applicant has found that it is possible to overcome this drawback to a certain degree by imparting to the valve seat about the piston orifice such a shape that the contact of the valve disc does not take place along a wide flat surface, but along a narrow annular seating which is as close to line contact as is practicable. This feature is clearly shown in FIGURE 2 of the drawings in which the orifice in general is of a cone-like configuration 5 having an outer frusto-conical surface 3 and the actual seating of the valve taking place along the lip 4, the extremely narrow dimension $e$ of which is reduced as much as possible with due regard to the strength of the materials used. In the case of pistons made of alloys such as that known as Zamak (which is a zinc-base, die-casting alloy containing approximately 4% of aluminum, approximately 0.04% of magnesium, and from zero to approximately 1.0% of copper), and a valve of sheet steel, the value of e for an orifice 1 having a diameter of approximately 7 mm., may advantageously be between about 0.3 and about 1 mm. Of course, the actual profile of the orifice rim 5 could be varied from that shown provided that the supporting area is reduced as just described.

In straightening the part b of the curve A to bring it more in line with the straight line B, the diameters of the orifices of the passageway through which the damping liquid moves from one side of the piston to the other, should be selected properly. The resistance to the flow of the oil through the passageway orifices themselves is of course added to a certain extent to the resistance to the flow of oil between the valves and their seats. This resistance to flow through the passageway orifices themselves can therefore be controlled to straighten the portion b of the curve A and bring it closer to the straight line B. It is therefore one factor of the present invention to not only select an approximate optimum cross-section of the passage openings but also, and this is very important, the variation of this optimum cross-section as a function of the reduction ratio r between the stroke of the wheel with respect to the frame and the stroke of the piston in the shock absorber cylinder. In the event that the orifices of the piston consist of two groups of cylindrical ports, the applicant has discovered that the optimum diameter d of the orifices, given in millimeters, is approximately according to the following equation:

$$d = \left(\frac{7+2r}{r}\right)\frac{D}{46}$$

in which D is the inner diameter of the cylinder, also in millimeters. For a cylinder of the diameter of 46 mm. this corresponds to an optimum diameter of the orifices of 9 mm. when the value of r is close to 1 (which condition frequently occurs in connection with the rear shock absorbers of present-day automobiles), and corresponds to an optimum diameter of 5.5 mm. when the value of r is close to 2 (frequently the case in front shock absorbers of present-day automobiles).

This value of the diameter of the orifices (or of the equivalent area in the case of non-circular orifices or in the case of a different number of orifices) can vary about 20% up or down with respect to the optimum value given by the above formula, without going beyond the scope of the present invention.

Under these conditions, in the case of shock absorbers for land vehicles in accordance with the present invention, the diameters of the passageway openings in the pistons of the front and rear shock absorbers may differ for one and the same vehicle, this being contrary to the usual practice up to the present time in the case of hydraulic shock absorbers employing valved pistons.

In FIGURES 8–13 inclusive there is illustrated another embodiment of the invention in which more passageways are provided through the piston than in the earlier described embodiments and which involve other minor changes of construction. In these figures, the narrowed or attenuated portion of the piston rod is represented as in the other figures by the numeral 12 and the piston body 20 is clamped upon the end of the rod by means of the nut 15 and the intervening upper and lower washers 13'. In this case the washers 13' have rounded edges. Clamped between the upper and lower surfaces of the piston 20 and the respective washers 13' are the relatively thin and flexible disc valves 21 and the reinforcing or stiffening disc 22 at the upper side and the resilient valve disc 24 and reinforcing disc 25 at the lower side.

In all, there are sixteen passageways passing through the piston from the upper surface to the lower surface thereof and a reference to FIGURES 12 and 13 of the drawings will reveal the allocation of these passageways to flow during the compression stroke and during the rebound stroke of the piston.

Referring now to FIGURE 12, which is a plan view of the top surface of the piston, it will be seen that the passageways are arranged in pairs and that the pairs of passageways 30, 31, 32 and 33 open out upon the upper surface through a plurality of raised bosses 35, the upper surfaces of these bosses being co-planar with the central boss 36 of the piston which directly underlies the valving provisions. It will be understood that the intervening surfaces of the piston 20 indicated at 37 occupy a slightly lower plane.

Also provided on the upper general surface of the piston 20 are the ledges or pedestals 39 which serve to give steadying and protecting support to the valving discs adjacent areas remote from the nozzles or orifices which are valved at the upper surface of the piston. These pedestals 39 also prevent the valve from coming too close to the passageways providing flow in the opposite direction through the piston.

Reference to FIGURE 11 of the drawings will clearly show how the valve disc 21 closes upon the orifices of the passageways 30, 31, 32 and 33 which control the rebound flow through the piston.

Referring now to FIGURE 13 of the drawings, it will be seen that the rebound passageways 30, 31, 32, 33 open out through the depressed lower surface 40 of the lower face of the piston which is at a lower level than the central boss 41 and the pedestals 42 which surround the orifices of the compression passageways 45, 46, 47 and 48. In FIGURES 8, 9 and 10 the operation of the valve discs 25 against the orifices of these passageways is clearly shown. Pedestals 50 are provided on the lower surface of the piston and serve the same purpose in connection with the valving 25 as the upper pedestals 39 serve in connection with the valve disc 21.

In accordance with one of the main principles of the present invention, the orifices of the various passageways which open out through the bosses 35 and 42 are bevelled off as at 55 so that for the minimum opening operating conditions (shown in FIGURE 8 for the compression valving) the valving 25 will be cracked or slightly open to the extent afforded by the bevelling of the orifice. The degree of bevel is greatly exaggerated in the drawings for purposes of clarity of illustration and it is to be understood that the depth of the bevelled edge is in the order of magnitude of a few tenths of a millimeter.

Under conditions of greater pressure and piston velocity during the compression stroke, the valve 25 will open further as, for example, as illustrated in FIGURE 9 of the drawings. Then, for perhaps the maximum opening during compression for a fairly rough road, the condition would be as illustrated in FIGURE 10.

Further with reference to the last described embodiment of the invention, it is to be observed that the provision of the multiplicity of passageways (16 in the illustrated embodiment) serves to distribute the "load" on the valve discs throughout a greater portion of their periphery. In fact, according to this embodiment, the damping oil reacts against approximately from 75° to 80° of the valve disc circumference on each side thereof, or a total of from about 150° to 160°. For a given total orifice area, distribution of the pressure over a wider arc of the discs serves to reduce the amount of flexing which must take place, with a consequent increase in valve disc life. Also, the arrangement of the arcuate orifices or groups of orifices upon diametrically opposite sides of the installation causes the disc valves to flex cylindrically rather than conically and this makes for better operation and prolonging the life of the discs.

There are a number of factors with regard to this piston valving arrangement which serve to prolong the life of the valve discs: the aforesaid distribution of the pressure over a larger area; the preliminary by-passing of the oil which eliminates the need for the valves to flex during low velocity strokes, or at the beginning of high velocity strokes; the radius provided on the retaining nut and washer which allows the disc to flex naturally around the edge of the washer or nut; the large diameter of the discs which are employed, the discs being almost as large as the piston itself, thus providing a long bending moment arm; and the provision of laminated construction of the discs where a plurality of discs of various diameters are stacked, thus preventing over-flexing and permitting the development of sufficient holding power without resorting to excessively thick discs.

It should also be borne in mind that, since the holes or openings are arranged in opposed groups the valve discs are not flexed in a truly "conical" manner, but tend to flex "cylindrically," as in the case of the arrangement described in my Patent No. 2,748,898. It is also to be noted that the valve discs are normally in a relaxed state and not pre-loaded as in the case of conventional shock absorbers of this general type.

Another advantage of the provision of the large number of openings employed in the last described embodiment of the invention may be mentioned. One suggested range of thickness of the valve discs for these purposes is from about 0.008" to about 0.018". The use of multiple discs of approximately this range of thickness in connection with the large number of openings used affords a great degree of control of the shock absorber action. If only two holes or openings of considerable diameter were used, instead of the present suggested arcuate orifice arrangement, extremely heavy discs would be required to prevent "gushing" and severe and excessive deflection.

It is understood that various changes and alterations may be made in the embodiments illustrated and described herein without departing from the scope of the invention as defined by the following claims.

Having thus described the invention, what is claimed as new and desired to be secured by Letters Patent is:

1. A double acting shock absorber of the class described, comprising a cylinder containing a working fluid, a single working piston contained therein and adapted to reciprocate within said cylinder and to have its movements damped by means of said fluid, and a solid piston rod fixed to said piston and extending through an opening in one end of the cylinder, said piston being the only piston device carried by said piston rod; said piston provided with two sets of passageways therethrough through which fluid may pass from one side of the piston to the other during working movement of the piston, one of said sets of passageways serving to transmit fluid in one direction through the piston and another different set of said passageways serving to transmit fluid in the opposite direction therethrough, and valve means controlling the flow of fluid in said respective sets of passageways; said respective sets of passageways for transmitting fluid in the two opposite directions being the only means for by-passing working fluid from one side of the piston to the other, said sets each arranged in only two groups of at least one passageway each, the groups of each set being positioned exactly diametrically opposite each other on opposite sides of the axis of the piston, and the groups of the set for flow in one direction being spaced 90° from the adjacent groups of the set for flow in the opposite direction, the passageways of said sets having inlet and outlet orifices on the respective sides of the piston; said valve means comprising at least one completely circular flat resilient leaf element secured fixedly adjacent its center to the central portion of one face of the piston, and at least one completely circular flat resilient leaf element secured fixedly adjacent its center to the central portion of the opposite face of the piston; said circular leaf elements being imperforate except for its axial central securing point, the leaf elements on each side of the piston adapted to extend over and resiliently control the flow of working fluid from the outlet orifices of the sets of passageways debouching on its respective side of the piston, and the inlet orifices of the other set of passageways on that side of the piston being spaced away from said circular leaf element so as not to be controlled thereby; the said outlet orifices being substantially in the plane of the leaf element which controls them and opening individually through the surface of the piston whereby flow through the respective passageways is individually controlled, the outlet orifices of the respective passageways for transmitting fluid in the same direction being disposed beneath diametrically opposite portions of the respective leaf elements at points remote from the axis thereof so that the leaf elements are stressed and resiliently bent only in a simple substantially cylindrical configuration by fluid issuing under pressure from the openings which they cover.

2. A double acting shock absorber of the class described, comprising a cylinder containing a working fluid, a single working piston contained therein and adapted to reciprocate within said cylinder and to have its movements damped by means of said fluid, and a solid piston rod fixed to said piston and extending through an opening in one end of the cylinder, said piston being the only piston device carried by said piston rod; said piston provided with two sets of passageways therethrough through which fluid may pass from one side of the piston to the other during working movement of the piston, one of said sets of passageways serving to transmit fluid in one direction through the piston and another different set of said passageways serving to transmit fluid in the opposite direction therethrough, and valve means controlling the flow of fluid in said respective sets of passageways; said respective sets of passageways for transmitting fluid in the two opposite directions being the only means for by-passing working fluid from one side of the piston to the other, said sets each arranged in only two groups of at least one passageway each, the groups of each set being positioned exactly diametrically opposite each other on opposite sides of the axis of the piston, and the groups of the set for flow in one direction being spaced 90° from the adjacent groups of the set for flow in the opposite direction, the passageways of said sets having inlet and outlet orifices on the respective sides of the piston, said valve means comprising at least one completely circular flat resilient leaf element secured fixedly adjacent its center to the central portion of one face of the piston, and at least one completely circular flat resilient leaf element secured fixedly adjacent its center to the central portion of the opposite face of the piston; the leaf elements on each side of the piston adapted to extend over and resiliently control the flow of working fluid from the outlet orifices of the sets of passageways debouching on its respective side of the piston, and the inlet orifices of the other set of passageways on that side of the piston being spaced away from said circular leaf element so as not to be controlled thereby; the said outlet orifices being substantially in the plane of the leaf element which controls them and opening individually through the surface of the piston whereby flow through the respective passageways is individually controlled, the outlet orifices of the respective passageways for transmitting fluid in the same direction being disposed beneath diametrically opposite portions of the respective leaf elements at points remote from the axis thereof so that the leaf elements are stressed and resiliently bent only in a simple substantially cylindrical configuration by fluid issuing under pressure from the openings which they cover, the controlled outlet orifices of the passageways debouching from the piston surface toward the leaf element which controls it, through a raised boss the top of which provides a narrow annular seating surface for said leaf element, and said annular seating surfaces around the respective orifices being chamfered radially outwardly so as to provide a permanently open slit for each passageway.

3. The shock absorber as set forth in claim 2 in which the chamfer of the orifice seating surfaces is on a gently curved contour.

4. The shock absorber as described in claim 1 in which each group of passageways assumes an arcuate configuration with its center of curvature at the axis of the piston, whereby the respective valve leaf elements controlling compression and rebound action are subjected to passageway pressures over a considerable arc upon diametrically opposite sides of the leaf elements, which causes the leaf elements to flex cylindrically rather than conically and the pressure to be distributed around the leaf elements, all of which has the effect of preventing fatigue and diminishing the wear on the said leaf elements.

5. A double acting shock absorber of the class described, comprising a cylinder containing a working fluid, a piston contained therein and adapted to reciprocate within said cylinder and to have its movements damped by means of said fluid, and a piston rod fixed to said piston and extending through an opening in one end of the cylinder; said piston provided with passageways therethrough through which fluid may pass from one side of the piston to the other during working movement of the piston, certain of said passageways serving to transmit fluid in one direction through the piston and other of said passageways serving to transmit fluid in the opposite direction, and valve means controlling the selective flow of fluid in said respective passageways; said passageways being arranged so that the first named passageways for flow in said one direction are circumferentially spaced from the second named passageways for flow in the opposite direction, said respective passageways for transmitting fluid in the two opposite directions each being arranged in two groups of at least one orifice each, said groups positioned exactly diametrically opposite each other on opposite sides of the piston, said valves comprising at least one flat resilient leaf element secured to the intermediate portion of one face of the piston and at least one flat resilient leaf element secured to the intermediate portion of the opposite face of the piston, said leaf elements adapted in repose to extend over the respective outlet orifices of the respective passageways which they control and to be spaced remotely from the inlet orifices of the other passageways, the outlet orifices of the respective passageways for transmitting fluid in the same direction being disposed beneath diametrically opposite portions of said respective leaf elements at points remote from the axis thereof so that the leaf elements are stressed and resiliently bent only in a simple substantially cylindrical configuration by fluid issuing under pressure from the openings which they cover; the respective faces of the piston having flat plane surfaces in two axially spaced levels, the passageways for flow of fluid in one direction having their inlet orifices on one face of the piston at a level axially inset from the level of said surface in which the outlet orifices of the other passageways are formed; and the valve leaf elements being secured to the respective piston faces approximately at the outer levels, whereby they control the outlet orifices of the appropriate passageways and lie in planes spaced axially from the plane of the inlet orifices of the other passageways.

6. The shock absorber as set forth in claim 5 in which each valve means comprises a stack of at least three superposed leaf elements, the leaf elements being of graduated diameter with the largest one nearer the orifices.

References Cited in the file of this patent

UNITED STATES PATENTS

| | | |
|---|---|---|
| 2,467,098 | Rossman | Apr. 12, 1949 |
| 2,670,814 | Ball | Mar. 2, 1954 |
| 2,673,625 | Crabtree | Mar. 30, 1954 |
| 2,676,676 | Strauss et al. | Apr. 27, 1954 |
| 2,748,898 | De Carbon | June 5, 1956 |